United States Patent [19]

Zawadzkas et al.

[11] Patent Number: 4,477,710
[45] Date of Patent: Oct. 16, 1984

[54] METHOD OF FORMING A HIGH TEMPERATURE, HIGH PRESSURE THIN FOIL SEAL

[75] Inventors: Gerald A. Zawadzkas, Elizabeth; Mau-Song Chou, Mountainside, both of N.J.

[73] Assignee: University of Rochester, Rochester, N.Y.

[21] Appl. No.: 83,427

[22] Filed: Oct. 10, 1979

Related U.S. Application Data

[63] Continuation of Ser. No. 873,345, Jan. 30, 1978, abandoned.

[51] Int. Cl.³ .............................................. B23K 11/08
[52] U.S. Cl. ............................... 219/117.1; 219/78.16; 219/86.21
[58] Field of Search .................. 219/137 R, 78.16, 71, 219/86.21, 125.1, 70, 117.1

[56] References Cited

U.S. PATENT DOCUMENTS

| | | | |
|---|---|---|---|
| 1,860,172 | 5/1932 | Chapman | 219/125.1 |
| 3,098,928 | 7/1963 | Wagner | 219/86.21 |
| 3,359,402 | 12/1967 | Rieppez | 219/78.16 |
| 3,458,683 | 7/1969 | Canonico . | |
| 4,117,300 | 9/1978 | Ricards . | |

*Primary Examiner*—C. L. Albritton
*Assistant Examiner*—Alfred S. Keve
*Attorney, Agent, or Firm*—Martin LuKacher

[57] ABSTRACT

A vacuum or high pressure seal operative at high temperatures is formed by placing a thin metal foil over an opening, and forming an electrical seam weld at the interface of the surface and the foil by guiding a needle-like electrode along a path around the opening at a substantially constant rate, with substantially constant pressure being applied to the electrode as it is moved along the path. When supported, the seal is capable of withstanding high pressures, say ten atmospheres, at high temperatures, say 500° C.

2 Claims, 4 Drawing Figures

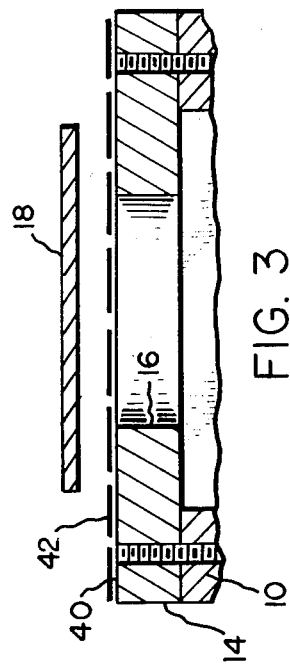
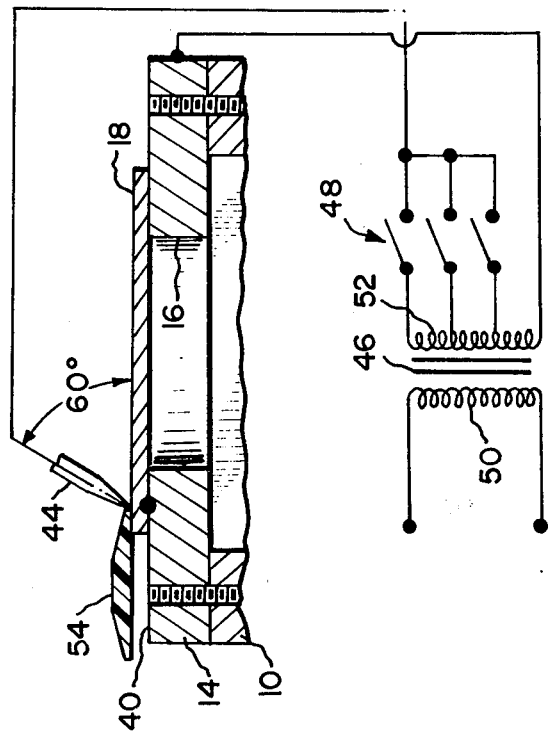
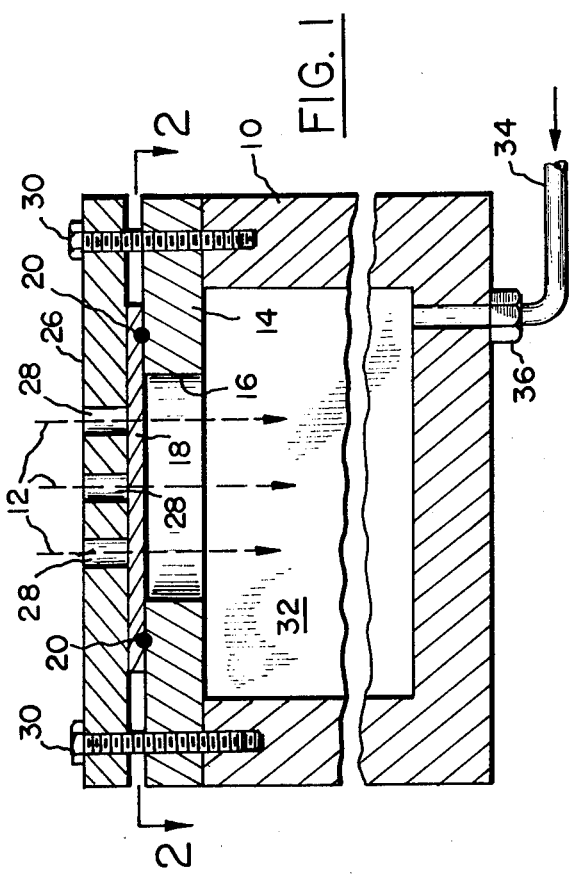
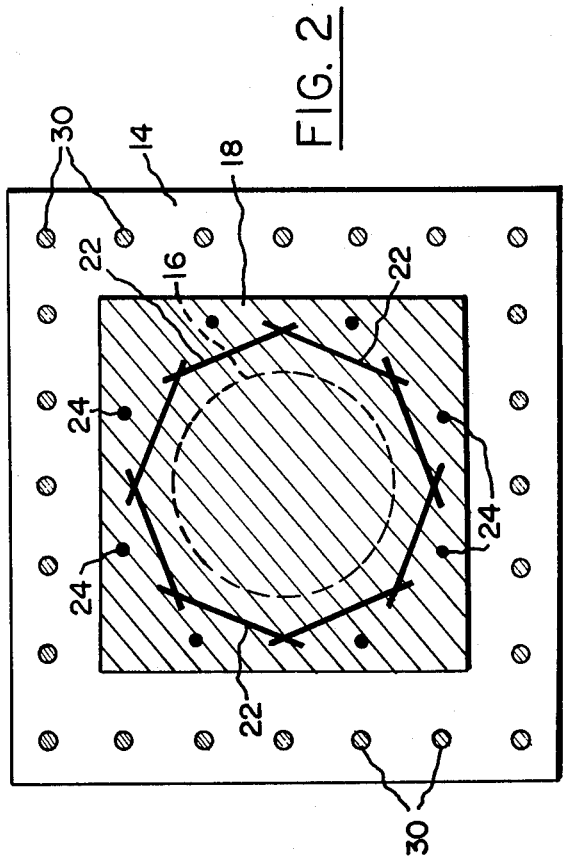

METHOD OF FORMING A HIGH TEMPERATURE, HIGH PRESSURE THIN FOIL SEAL

This application is a continuation of application Ser. No. 873,345 filed Jan. 30, 1978, now abandoned.

The present invention relates to methods of forming seals with thin metal foil. The invention also relates to methods of welding thin foils to metal surfaces which is capable of forming a vacuum or high pressure seal operative at high temperatures.

The invention is especially suitable for providing sealed containers which are adapted to contain gaseous laser mediums at elevated temperatures and pressures. The invention is applicable for use in electron beam devices for providing a thin metal foil seal which is adapted to pass an electron beam into the container. The invention will also find application wherever welding of thin metallic foil to metal surfaces is desired.

Thin metal foil has heretofore been used to seal openings. Seals have been provided by machining a ridge about the opening in the metal surface which is to be sealed and clamping the foil on to the surface against the ridge. Ridges tend to sever the foil. They are difficult and expensive to machine. In repeated use, seals formed through the use of ridges are unreliable since the ridge becomes dull or nicked so as to preclude the establishment of a vacuum tight seal. It has also been proposed to use a thin wire. The wire is located around the opening on the metal surface and the foil is clamped against the wire. Wires are also unreliable in forming tight seals. The material of the wire unless it is a noble metal, such as gold, can contaminate the sealed region. Gold wire is unsuitable in high temperature applications since it melts, destroying the seal before the desired operating temperature is reached.

It has been discovered in accordance with the invention that a vacuum seal capable of withstanding both high pressure and temperature can be formed by electrically welding a metal foil to a metal surface. The invention may also be used wherever thin metal foil must be attached to a metal surface without severing the foil. A container for gas or other material which is to be exposed to electron beams may utilize a thin metal foil seal which is provided in accordance with the invention. The metal foil seals an opening in the container and, because of its thinness, enables the electron beam to pass into the container. For example, the seal enables the containment of gaseous laser mediums at elevated temperatures and high pressures to be pumped with electron beams through the foil.

Accordingly, it is an object of the present invention to provide an improved method whereby thin metal foil may be welded to metal surfaces.

It is another object of the present invention to provide improved methods for sealing an opening with the aid of a thin metal foil so as to form a seal capable of withstanding both high pressure and temperature.

It is a further object of the invention to provide improved apparatus for containing gaseous mediums at high temperature, into which mediums electron beams may be directed.

It is a still further object of the present invention to provide an improved method of forming a thin metal foil seal which is reliable in operation both at high pressures and temperatures and which may be easily removed and replaced.

Briefly described, the method of sealing an opening in a metallic member with a metal foil in accordance with the invention makes use of the steps of applying the film of water over the surface of the metallic member in which the opening to be sealed is disposed. Then the thin metal foil is placed so as to lie flat on the surface and to extend over the opening. A seam weld is then formed around the opening at the interface between the surface and the foil. This weld is provided with the aid of a needle-like electrode which is pressed against the foil with constant pressure and moved along a path extending about the opening at a constant rate while current is passed between the metallic member and the electrode. The method may be practiced manually. The pressure and rate may vary somewhat and are not critical.

The foregoing and other objects and advantages of the invention as well as a presently preferred embodiment thereof and the best mode presently known of practicing the invention, will be more fully understood from a reading of the following description in connection with the accompanying drawings in which:

FIG. 1 is a sectional view of a container having a seal provided in accordance with the invention;

FIG. 2 is a sectional view of the container shown in FIG. 1, the section being taken along the line 2—2 in FIG. 1;

FIG. 3 is a diagrammatic sectional view illustrating the relative location of the foil, the film of water, and the metallic surface as the method provided by the invention is carried out; and FIG. 4 is another diagrammatic sectional view showing the relationship of the thin metal foil, the metal surface, the electrode, and a guide member for the electrode, as the welding step in forming the seal in accordance with the method provided by the invention is carried out.

Referring more particularly to FIGS. 1 and 2, there is shown a container 10 for a gaseous medium which may be maintained at high pressure and high temperature as in a gas laser and which receives electron beams 12. A metallic member in the form of a stainless steel or steel alloy plate 14 provides a wall of the container 10. This plate has an opening 16 through which the electron beams 12 pass. This opening is sealed by a thin metal foil 18. The foil may be stainless steel or titanium having a thickness say of 1 to 3 mils and thus is flimsy. The plate 14 may be welded to the other walls of the container 10 so that the container is sealed except at the opening 16. A seam weld 20 at the interface of the surface of the plate 14 and the foil 18 provide a vacuum tight seal which is capable of withstanding both high pressure and temperature. The weld 20 extends around the opening 16 along a path which encompasses the opening. The path has a plurality of courses 22 which define a polygon; an octagon being illustrated. The intersection of the courses 22 overlap each other slightly. In addition to the seam weld, there are provided a plurality of spot welds 24 which are diametrically opposite to each other and are located outside the seam weld. The spot welds are made first in the process of providing the seal with the foil 18 and enable the foil to be held, stretched tight and flat across the surface of the plate 14 while the courses 22 of the seam weld 20 are formed. In order to prevent rupture of the thin metal foil 18, a support plate 26 having a plurality of slots 28 for the passage of the electron beams 12 is disposed over the foil 18 and fastened to the plate 14 by means of bolts 30. The support plate 26 is disposed on the low pressure side of the foil 18. In the event a laser medium is in the container the end walls may be of material which is transparent at the lasing wavelength.

The gaseous, high pressure medium may be applied to the region 32 within the container 10 by means of a high pressure line 34 and coupling 36.

As shown in FIGS. 3 and 4, the sealing of the opening 16 in the container is provided at the metallic surface 40 of the plate 14. As a first step, a thin film of water 42 is applied to the surface 40. It has been found that the use of this film of water assists in providing the vacuum tight seal and successful formation of the seam weld 20. It is believed that the water film increases the surface tension between the foil and the surface 40 and draws the foil against the surface, without creases or folds. Also the water dissipates heat during making of the weld. Also during welding some cooling liquid, preferably water, can be sprayed on the area being welded. This also assists in preventing accidental burning of the foil and results in greater uniformity in the seam. The metal foil 18 is stretched across the opening. The water film 42 is, of course, stationary when the foil 18 is applied. The foil overlaps the surface 40.

Then a needle-like electrode 44 is used. This electrode is preferably the tip of an electric marker which is of the type used in engraving machines. Suitably a marker machine such as Model EM-120 available from H. P. Preis Engraving Machine Co. of Hillside, N.J., may be used to provide the electrode 44 and a holder therefor. The electrode tip is brass or copper and it receives alternating current from a step-down transformer 46. The end of the tip which contacts the foil may have a radius of about 0.5 mm. The magnitude of the voltage may be selected by means of auto-transformer action or switches 48 which are shown in order to simplify the illustration. Rheostats or other current control devices may also be used. The operating supply for the primary winding 50 of the transformer may be the alternating current power line. The circuit for welding is completed by connecting one end of the secondary 52 of the transformer to the plate 14. The opposite end is connected to the electrode 44.

In order to define the path of the courses 22 (FIG. 2) a straight edge member 54 is used. This may be a ruler and may suitably be of acrylic material. The straight edge is placed on the foil. The electrode is then guided along the edge. The electrode is held at a predetermined angle, suitably 60°. The angle is not critical although 60° is preferred. The electrode may be held upright. While the marker with the electrode 44 may be manipulated manually, automatic manipulation may of course be used. The electrode is guided along the edge of the straight edge member 54 with substantially constant pressure applied against the foil and at a substantially constant rate, suitably 1 to 2 cm/sec. The pressure is sufficient to maintain good contact without severing or rupturing the foil. The seam weld 20 is then formed at the interface between the surface 40 and the foil 18. As mentioned above, it may be desirable to utilize the electrode 44 prior to forming the seam weld 20 to provide a number of spot welds 24. Spot welding preliminary to seam welding is preferable since it guards against the formation of any folds or creases in the foil 18.

By way of example, a 1 mil titanium foil and a 1 mil stainless steel foil were welded onto stainless steel and steel alloy No. 17-22AS. The welding current was 50 amperes at 0.9 volts. Alternating current was used.

By way of further example, 2 mil titanium foil and 2 mil stainless steel foil were welded onto a stainless steel surface and onto the surface of steel alloy No. 17-22AS with a welding current of 70 amps at a voltage of 1.1 volts. Alternating current was also used.

By way of further example, 3 mil titanium foil was welded onto stainless steel and also onto steel alloy No. 17-22AS using 200 amperes at 2 volts, alternating current.

In tests, the foil created a seal which withstood a temperature of 500° C. and a pressure of 10 atmospheres for three hours.

From the foregoing description it will be apparent that there has been provided an improved welding method as well as an improved method for forming seals through the use of thin metal foils, which seals are capable of withstanding both high pressure and temperature. Apparatus in the form of a container for high temperature, high pressure mediums and electron beam irradiation have also been described. Variations and modifications in the herein described methods and apparatus will undoubtedly suggest themselves to those skilled in the art. For example the courses 22 need not be straight. Accordingly, the foregoing description should be taken merely as illustrative and not in any limiting sense.

What is claimed is:

1. The method of sealing an opening in a metallic member with a flimsy metal foil which comprises the steps of applying in air a stationary film of water over a surface of said metallic member in which said opening is disposed, then placing said foil upon said film on said surface across said opening such that foil is drawn against said surface, supporting said foil with the aid of a second member disposed on the side of said foil which faces away from said surface and extends over said opening, and then electrically welding said foil to said metallic member along a path extending about said opening and inward from the edge of said foil.

2. The invention as set forth in claim 1 further comprising the step of attaching said second member to said first named member beyond where said second member extends outwardly from said opening and beyond said path.

* * * * *